United States Patent
Bertero et al.

(10) Patent No.: US 9,269,382 B1
(45) Date of Patent: Feb. 23, 2016

(54) METHOD AND SYSTEM FOR PROVIDING A READ TRANSDUCER HAVING IMPROVED PINNING OF THE PINNED LAYER AT HIGHER RECORDING DENSITIES

(71) Applicant: Western Digital (Fremont), LLC, Fremont, CA (US)

(72) Inventors: Gerardo A. Bertero, Redwood City, CA (US); Kuok San Ho, Emerald Hills, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/556,411

(22) Filed: Dec. 1, 2014

Related U.S. Application Data

(62) Division of application No. 13/538,660, filed on Jun. 29, 2012, now abandoned.

(51) Int. Cl.
*G11B 5/39* (2006.01)
*G11B 5/31* (2006.01)

(52) U.S. Cl.
CPC .............. *G11B 5/3929* (2013.01); *G11B 5/398* (2013.01); *G11B 5/3163* (2013.01); *G11B 2005/3996* (2013.01)

(58) Field of Classification Search
CPC ....................... G11B 5/3932; G11B 2005/3996
USPC .................................................... 360/324.11
See application file for complete search history.

(56) References Cited

U.S. PATENT DOCUMENTS

| | | | |
|---|---|---|---|
| 5,612,098 A | 3/1997 | Tan et al. | |
| 5,717,550 A | 2/1998 | Nepela et al. | |
| 5,828,530 A | 10/1998 | Gill et al. | |
| 5,876,848 A | 3/1999 | Tan et al. | |
| 5,898,547 A | 4/1999 | Fontana, Jr. et al. | |
| 5,936,810 A * | 8/1999 | Nakamoto et al. | 360/324.1 |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |

(Continued)

OTHER PUBLICATIONS

Gerardo A. Bertero, et al., U.S. Appl. No. 13/538,660, filed Jun. 29, 2012, 48 pages.

(Continued)

*Primary Examiner* — Craig A. Renner

(57) ABSTRACT

A method and system provide a magnetic read transducer having an air-bearing surface (ABS). The magnetic read transducer includes a read sensor stack and a pinning structure. The read sensor stack includes a pinned layer, a spacer layer, and a free layer. The spacer layer is nonmagnetic and between the pinned layer and the free layer. A portion of the read sensor stack is at the ABS. The pinning structure includes a hard magnetic layer recessed from the ABS, recessed from the free layer and adjacent to a portion of the pinned layer.

18 Claims, 8 Drawing Sheets

(56) References Cited

U.S. PATENT DOCUMENTS

| | | |
|---|---|---|
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,466,419 B1 | 10/2002 | Mao |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,546 B2 | 7/2003 | Gill |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,631,055 B2 | 10/2003 | Childress et al. |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |

(56) References Cited

U.S. PATENT DOCUMENTS

| | | | |
|---|---|---|---|
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,828 B2 | 1/2004 | Gill |
| 6,680,830 B2 | 1/2004 | Gill |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,724,584 B2 | 4/2004 | Mack et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,738,236 B1 | 5/2004 | Mao et al. |
| 6,738,237 B2 | 5/2004 | Gill |
| 6,741,432 B2 | 5/2004 | Pinarbasi |
| 6,744,607 B2 | 6/2004 | Freitag et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,751,845 B2 | 6/2004 | Gill |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,798 B2 | 8/2004 | Gill |
| 6,781,927 B1 | 8/2004 | Heanuc et al. |
| 6,785,102 B2 | 8/2004 | Freitag et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,801,412 B2 | 10/2004 | Gill |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,833,982 B2 | 12/2004 | Jayasekara |
| 6,834,010 B1 | 12/2004 | Qi et al. |
| 6,847,510 B2 | 1/2005 | Childress et al. |
| 6,856,493 B2 | 2/2005 | Pinarbasi |
| 6,859,343 B1 | 2/2005 | Alfoqaha et al. |
| 6,859,348 B2 | 2/2005 | Pinarbasi |
| 6,859,997 B1 | 3/2005 | Tong et al. |
| 6,861,937 B1 | 3/2005 | Feng et al. |
| 6,865,062 B2 | 3/2005 | Pinarbasi |
| 6,867,952 B2 | 3/2005 | Hasegawa |
| 6,867,953 B2 | 3/2005 | Gill |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,901,652 B2 | 6/2005 | Hasegawa et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,933,042 B2 | 8/2005 | Gill |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,943,997 B2 | 9/2005 | Gill |
| 6,944,938 B1 | 9/2005 | Crue, Jr. et al. |
| 6,947,258 B1 | 9/2005 | Li |
| 6,947,264 B2 | 9/2005 | Gill |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,983,530 B2 | 1/2006 | Gill |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,016,168 B2 | 3/2006 | Li et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,035,059 B2 | 4/2006 | Gill |
| 7,035,062 B1 | 4/2006 | Mao et al. |
| 7,037,847 B2 | 5/2006 | Le et al. |
| 7,038,889 B2 | 5/2006 | Freitag et al. |
| 7,041,985 B1 | 5/2006 | Wang et al. |
| 7,046,490 B1 | 5/2006 | Ueno et al. |
| 7,050,277 B2 | 5/2006 | Gill et al. |
| 7,054,113 B1 | 5/2006 | Seagle et al. |
| 7,057,857 B1 | 6/2006 | Niu et al. |
| 7,059,868 B1 | 6/2006 | Yan |
| 7,072,154 B1 | 7/2006 | Gill et al. |
| 7,082,017 B2 | 7/2006 | Freitag et al. |
| 7,092,195 B1 | 8/2006 | Liu et al. |
| 7,092,220 B2 | 8/2006 | Gill et al. |
| 7,092,221 B2 | 8/2006 | Gill |
| 7,094,130 B2 | 8/2006 | Cyrille et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,161,773 B2 | 1/2007 | Fontana, Jr. et al. |
| 7,170,725 B1 | 1/2007 | Zhou et al. |
| 7,171,741 B2 | 2/2007 | Gill |
| 7,177,117 B1 | 2/2007 | Jiang et al. |
| 7,177,120 B2 | 2/2007 | Freitag et al. |
| 7,193,815 B1 | 3/2007 | Stoev et al. |
| 7,196,878 B2 | 3/2007 | Fox et al. |
| 7,196,880 B1 | 3/2007 | Anderson et al. |
| 7,199,974 B1 | 4/2007 | Alfoqaha |

(56) References Cited

U.S. PATENT DOCUMENTS

| | | |
|---|---|---|
| 7,199,975 B1 | 4/2007 | Pan |
| 7,211,339 B1 | 5/2007 | Seagle et al. |
| 7,212,384 B1 | 5/2007 | Stoev et al. |
| 7,220,499 B2 | 5/2007 | Saito et al. |
| 7,238,292 B1 | 7/2007 | He et al. |
| 7,239,478 B1 | 7/2007 | Sin et al. |
| 7,245,463 B2 | 7/2007 | Gill |
| 7,248,431 B1 | 7/2007 | Liu et al. |
| 7,248,433 B1 | 7/2007 | Stoev et al. |
| 7,248,447 B2 | 7/2007 | Gill |
| 7,248,449 B1 | 7/2007 | Seagle |
| 7,265,946 B2 | 9/2007 | Gill |
| 7,268,980 B2 | 9/2007 | Gill |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,313,856 B2 | 1/2008 | Gill |
| 7,318,947 B1 | 1/2008 | Park et al. |
| 7,324,310 B2 | 1/2008 | Gill |
| 7,330,339 B2 | 2/2008 | Gill |
| 7,333,295 B1 | 2/2008 | Medina et al. |
| 7,337,530 B1 | 3/2008 | Stoev et al. |
| 7,342,752 B1 | 3/2008 | Zhang et al. |
| 7,345,854 B2 | 3/2008 | Takano |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,365,949 B2 | 4/2008 | Hayakawa et al. |
| 7,369,371 B2 | 5/2008 | Freitag et al. |
| 7,370,404 B2 | 5/2008 | Gill et al. |
| 7,371,152 B1 | 5/2008 | Newman |
| 7,372,665 B1 | 5/2008 | Stoev et al. |
| 7,372,674 B2 | 5/2008 | Gill |
| 7,375,926 B1 | 5/2008 | Stoev et al. |
| 7,379,269 B1 | 5/2008 | Krounbi et al. |
| 7,382,589 B2 | 6/2008 | Lin et al. |
| 7,386,933 B1 | 6/2008 | Krounbi et al. |
| 7,389,577 B1 | 6/2008 | Shang et al. |
| 7,405,908 B2 | 7/2008 | Gill |
| 7,405,909 B2 | 7/2008 | Gill |
| 7,417,832 B1 | 8/2008 | Erickson et al. |
| 7,419,610 B2 | 9/2008 | Cyrille et al. |
| 7,419,891 B1 | 9/2008 | Chen et al. |
| 7,420,787 B2 | 9/2008 | Freitag et al. |
| 7,420,788 B2 | 9/2008 | Pinarbasi |
| 7,428,124 B1 | 9/2008 | Song et al. |
| 7,430,098 B1 | 9/2008 | Song et al. |
| 7,436,620 B1 | 10/2008 | Kang et al. |
| 7,436,637 B2 | 10/2008 | Pinarbasi |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,463,459 B2 | 12/2008 | Ding et al. |
| 7,466,524 B2 | 12/2008 | Freitag et al. |
| 7,469,465 B2 | 12/2008 | Ding et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,522,391 B2 | 4/2009 | Freitag et al. |
| 7,522,392 B2 | 4/2009 | Carey et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,580,230 B2 | 8/2009 | Freitag et al. |
| 7,583,466 B2 | 9/2009 | Kermiche et al. |
| 7,595,967 B1 | 9/2009 | Moon et al. |
| 7,599,155 B2 | 10/2009 | Saito et al. |
| 7,602,589 B2 | 10/2009 | Freitag et al. |
| 7,616,411 B2 | 11/2009 | Gill |
| 7,639,457 B1 | 12/2009 | Chen et al. |
| 7,652,856 B2 | 1/2010 | Pinarbasi |
| 7,660,080 B1 | 2/2010 | Liu et al. |
| 7,663,846 B2 | 2/2010 | Freitag et al. |
| 7,672,080 B1 | 3/2010 | Tang et al. |
| 7,672,086 B1 | 3/2010 | Jiang |
| 7,676,905 B2 | 3/2010 | Pinarbasi |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,697,242 B2 | 4/2010 | Gill |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,800,867 B2 | 9/2010 | Saito et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,916,435 B1 | 3/2011 | Gill |
| 7,918,013 B1 | 4/2011 | Dunn et al. |
| 7,961,440 B2 | 6/2011 | Gill et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,068,317 B2 | 11/2011 | Gill |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,149,548 B2 | 4/2012 | Hatatani et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |

(56) References Cited

U.S. PATENT DOCUMENTS

| | | |
|---|---|---|
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,266,785 B2 | 9/2012 | Freitag et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,318,030 B2 | 11/2012 | Peng et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,333,898 B2 | 12/2012 | Brown et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,400,738 B2 | 3/2013 | Covington et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |

(56) References Cited

U.S. PATENT DOCUMENTS

| | | |
|---|---|---|
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 * | 3/2014 | Ho et al. .................. 360/324.11 |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2002/0131219 A1 | 9/2002 | Mack et al. |
| 2003/0123198 A1 | 7/2003 | Sugawara et al. |
| 2003/0179520 A1 | 9/2003 | Hasegawa |
| 2004/0061983 A1 | 4/2004 | Childress et al. |
| 2004/0166368 A1 | 8/2004 | Gill et al. |
| 2005/0270703 A1 * | 12/2005 | Hayakawa et al. ......... 360/324.1 |
| 2006/0023375 A1 | 2/2006 | Gill |
| 2006/0092582 A1 | 5/2006 | Gill et al. |
| 2006/0230601 A1 * | 10/2006 | Gill et al. .................. 29/603.13 |
| 2006/0232893 A1 * | 10/2006 | Gill et al. ................. 360/324.12 |
| 2006/0285259 A1 | 12/2006 | Gill et al. |
| 2008/0180863 A1 | 7/2008 | Gill |
| 2009/0086385 A1 | 4/2009 | Gill et al. |
| 2009/0316308 A1 | 12/2009 | Saito et al. |
| 2010/0232072 A1 | 9/2010 | Dimitrov et al. |
| 2010/0290157 A1 | 11/2010 | Zhang et al. |
| 2011/0086240 A1 | 4/2011 | Xiang et al. |
| 2011/0228428 A1 | 9/2011 | Dimitrov et al. |
| 2012/0111826 A1 | 5/2012 | Chen et al. |
| 2012/0134057 A1 | 5/2012 | Song et al. |
| 2012/0216378 A1 | 8/2012 | Emley et al. |
| 2012/0237878 A1 | 9/2012 | Zeng et al. |
| 2012/0276415 A1 | 11/2012 | Sapozhnikov et al. |
| 2012/0298621 A1 | 11/2012 | Gao |
| 2013/0082696 A1 | 4/2013 | Le et al. |
| 2013/0092654 A1 | 4/2013 | Balamane et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Yimin Guo, et al., U.S. Appl. No. 12/731,108, filed Mar. 24, 2010, 25 pages.

Advisory Action dated Aug. 25, 2014 from U.S. Appl. No. 13/538,660, 3 pages.

Office Action dated Jun. 19, 2014 from U.S. Appl. No. 13/538,660, 15 pages.

Office Action dated Dec. 19, 2013 from U.S. Appl. No. 13/538,660, 11 pages.

Wei Gao, et al., U.S. Appl. No. 13/963,328, filed Aug. 9, 2013, 18 pages.

* cited by examiner

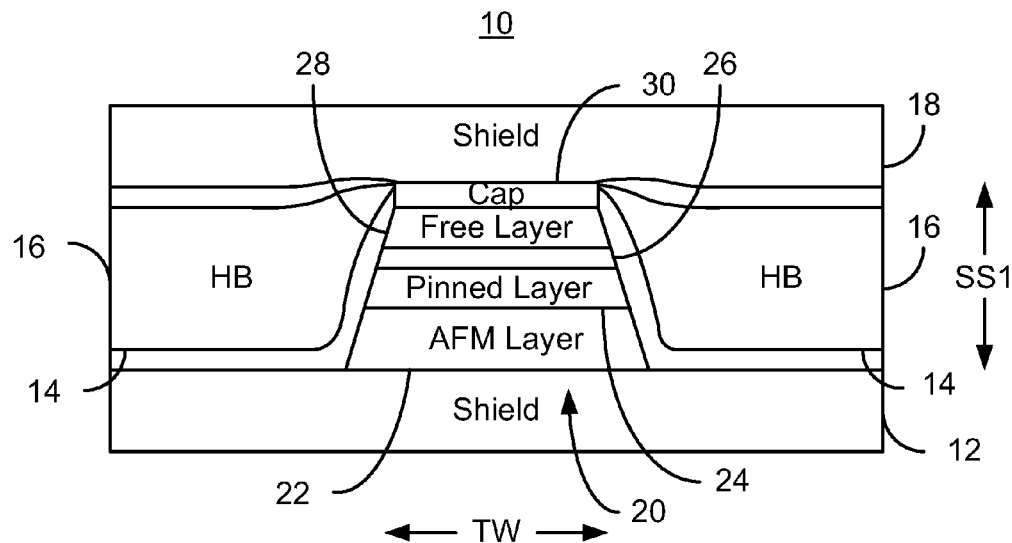
Prior Art
FIG. 1
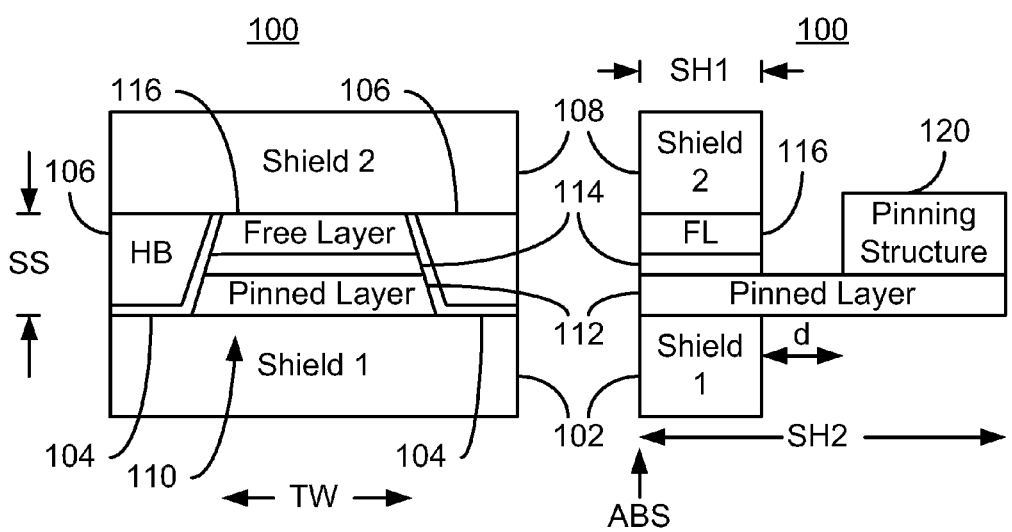
ABS View
FIG. 2A
Side View
FIG. 2B

US 9,269,382 B1

METHOD AND SYSTEM FOR PROVIDING A READ TRANSDUCER HAVING IMPROVED PINNING OF THE PINNED LAYER AT HIGHER RECORDING DENSITIES

CROSS REFERENCE TO RELATED APPLICATIONS

This application is a divisional of U.S. patent application Ser. No. 13/538,660, filed on Jun. 29, 2012, which is hereby incorporated by reference in its entirety.

BACKGROUND

FIG. 1 depicts an air-bearing surface (ABS) view of a conventional read transducer used in magnetic recording technology applications. The conventional read transducer 10 includes shields 12 and 18, insulator 14, hard bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. If the sensor 20 is to be used in a current perpendicular to plane (CPP) configuration, then current is driven in a direction substantially perpendicular to the plane of the layers 22, 24, 26, and 28. Conversely, in a current parallel to plane (CIP) configuration, then conductive leads (not shown) would be provided on the hard bias structures 16. The hard bias structures 16 are used to magnetically bias the free layer 28. In an ideal case, the hard bias structures 16 match the thickness, moment, and location of the sensor layer 28.

Although the conventional transducer 10 functions, there are drawbacks. The trend in magnetic recording is to higher density memories. A lower track width, TW is desired for reading higher density memories. As track width decreases, the widths of other layers, such as the AFM layer 22, are also reduced. Although the AFM layer 22 can have a reduced width, the size of the crystallographic grains within the AFM layer 22 are desired not to scale with width. This is because smaller grain sizes correspond to a lower blocking temperature for the AFM layer 22. Scaling the grains of the AFM layer 22 would result in an AFM layer 22 that is more disordered at operating temperatures, which is undesirable. However, larger grains for the AFM layer 22 adversely affect the ability of the AFM layer to pin of the magnetic moment of the pinned layer 12 in the preferred orientation. For example, the grains for an IrMn AFM layer 22 are typically on the order of seven to ten nanometers in diameter. An AFM layer 22 that is twenty-five nanometers by thirty nanometers has a significantly reduced number of grains (e.g. on the order of 12) versus an AFM layer 22 that is fifty nanometers by sixty nanometers (e.g. on the order of forty-eight). The quality of the magnetic bias provided by the AFM layer 22 is related to the number of grains in the AFM layer 22. As a result, the ability of the AFM layer 22 to pin the magnetic moment of the pinned layer 24 in the desired direction is compromised at higher densities. Poorer pinning of the magnetic moment of the pinned layer 24 adversely affects performance of the conventional magnetic transducer 10.

In addition, a reduced shield-to-shield spacing, SS1, is desired for higher density memories. For example, for a shield-to-shield spacing for the conventional read transducer 10 of approximately twenty-two nanometers, approximately one-third is occupied by the AFM layer 22. The thickness of the AFM layer 22 may be reduced slightly. However, such reductions in the thickness of the AFM layer 22 adversely affect the thermal stability of the magnetoresistive sensor 20. Such instabilities in the magnetoresistive sensor 20 are undesirable.

Accordingly, what is needed is a system and method for improving the performance of a magnetic recording read transducer.

BRIEF SUMMARY OF THE INVENTION

A method and system provide a magnetic read transducer having an air-bearing surface (ABS). The magnetic read transducer includes a read sensor stack and a pinning structure. The read sensor stack includes a pinned layer, a spacer layer, and a free layer. The spacer layer is nonmagnetic and between the pinned layer and the free layer. A portion of the read sensor stack is at the ABS. The pinning structure includes a hard magnetic layer recessed from the ABS, recessed from the free layer and adjacent to a portion of the pinned layer.

BRIEF DESCRIPTION OF SEVERAL VIEWS OF THE DRAWINGS

FIG. 1 depicts an ABS view of a conventional magnetic recording read transducer.

FIGS. 2A-2B depicts ABS and side views of an exemplary embodiment of a portion of a magnetic recording read transducer.

DETAILED DESCRIPTION OF THE PREFERRED EMBODIMENTS

Figure 3:
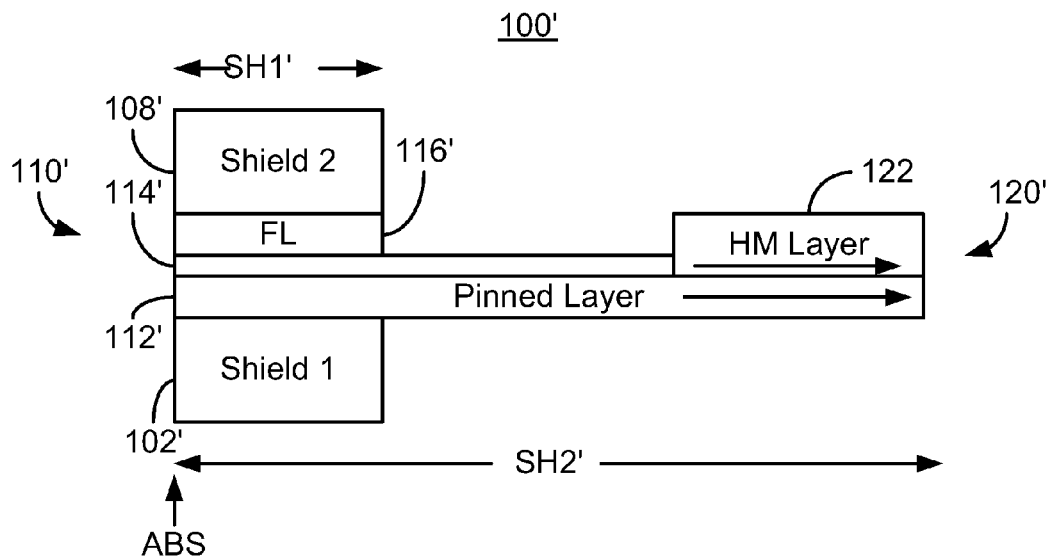
FIG. 3 depicts a side view of another exemplary embodiment of a portion of a magnetic recording read transducer.

FIGS. 2A-2B depict ABS and side views of an exemplary embodiment of a portion of a magnetic read transducer 100. For clarity, FIGS. 2A-2B are not to scale. The read transducer 100 may be part of a read head or may be part of a merged head that also includes a write transducer. The head of which the read transducer 100 is a part is contained in a disk drive having a media, a slider and the head coupled with the slider. Further, only a portion of the components of the read transducer 100 are depicted The transducer 100 includes optional soft magnetic shields 102 and 108, optional insulator 104, optional hard biasing layers 106, a read sensor 110 and at least one pinning structure 120. The sensor 110 includes a pinned layer 112, a nonmagnetic spacer layer 114, and a free layer 116. The pinned layer 112 and free layer 116 are ferromagnetic. However, the magnetization of the pinned layer 112 is stable, while that of the free layer 116 may respond to an external magnetic field. The free layer 116 may, however, be magnetically biased by the hard bias layers 106. The hard bias layers 106 may, for example, ensure that the free layer 116 is single domain. The pinned layer 112 is shown as a single layer. However, in some embodiments, the pinned layer 112 may be a multilayer including but not limited to a SAF structure. The free layer 116 is shown as a single layer, but may be a multilayer including but not limited to a SAF structure. In the embodiment shown, the pinned layer 112 is an extended pinned layer having a stripe height SH2 that is greater than that of the free layer, SH1. The nonmagnetic spacer layer 114 may be a conductor, an insulator such as a tunneling barrier layer, or other similar structure. In some embodiments, therefore, the sensor 110 is a GMR or TMR sensor. However, there is no AFM layer at the ABS. In other embodiments, such an AFM layer may be included at the ABS. In addition, the pinned layer 112 is an extended pinned layer. Stated differently, the pinned layer 112 extends further from the ABS in the stripe height direction than the free layer 116 (as is shown in FIG. 2B). In the embodiment shown, the pinned layer 112' is an extended pinned layer having a stripe height SH2' that is greater than that of the free layer, SH1'.

The pinning structure 120 is used to magnetically bias the pinned layer 112 via an exchange interaction. The pinning structure 120 includes at least one hard magnetic layer (not shown) that is recessed from the free layer 116 by a distance d. The hard magnetic layer may include materials such as Co and/or Fe. The hard magnetic layer may be a single constituent layer, an alloy, a multilayer, or some other structure. In some embodiments, the pinning structure 120 is recessed from the free layer 116 by at least fifty Angstroms. In some embodiments, the pinning structure 120 may be recessed from the free layer 116 by not more than one micron. The pinning structure 120 may also include a soft magnetic layer and a nonmagnetic layer between the soft magnetic layer and the hard magnetic layer. In some embodiments, the hard magnetic layer adjoins (i.e. shares an interface with) the pinned layer 112. In other embodiments, there may be a layer between the pinned layer 112 and the hard magnetic layer. For example, the pinning structure 120 may include a nonmagnetic layer between the hard magnetic layer and the pinned layer 114. As used herein, a nonmagnetic layer in the pinning structure 120 is one which, when in the bulk and free from external magnetic fields is nonmagnetic. However, when adjoining a ferromagnetic layer such as the hard magnetic layer, the nonmagnetic layer may be magnetized. For example, the nonmagnetic layer may include Ru.

The pinning structure 120 is adjacent to the pinned layer 112. The pinning structure 120 is shown on the pinned layer 112. However, in another embodiment, the pinned layer 112 may be on the pinning structure 120. The pinning structure 120 may have the same width in the track width direction (TW) as the free layer 116 and pinned layer 112. In some embodiments, the pinning structure 120 is wider than the free layer 116 in the track width direction. In some such embodiments, the pinned layer 112 is also wider than the free layer in the track width direction at least where the pinned layer 112 is adjacent to the pinning structure 120.

The pinning structure 120 is used to stabilize the pinned layer 112. More specifically, the hard magnetic layer of the pinning structure 120 magnetically biases, or pins, the magnetization of the pinned layer 112 in the desired direction. In some embodiments, the pinning structure 120 pins the magnetic moment of the pinned layer 112 in a direction perpendicular to the ABS (i.e. the stripe height direction). This pinning may be assisted by the shape anisotropy of the pinned layer 112.

Using the pinning structure 120, the magnetic moment of the pinned layer 112 can be stabilized in the desired direction. This may be achieved with a reduced track width of the read sensor 110 and a lower shield-to-shield spacing, SS. The reduction in the shield-to-shield spacing may be achieved at least in part because the AFM layer 22 may be omitted at the ABS. Thus, a read transducer 100 suitable for use at higher magnetic recording densities may be provided.

FIG. 3 depicts a side view of an exemplary embodiment of a portion of a magnetic read transducer 100'. For clarity, FIG. 3 is not to scale. The read transducer 100' may be part of a read head or may be part of a merged head that also includes a write transducer. The head of which the read transducer 100' is a part is part of a disk drive having a media, a slider and the head coupled with the slider. Further, the magnetic read transducer 100' corresponds to the magnetic read transducer 100. Similar components have analogous labels. The magnetic transducer 100' includes optional shields 102' and 108', nonmagnetic insulating layer (not shown), sensor 110' having pinned layer 112', nonmagnetic spacer layer 114', and free layer 116', optional bias layers (not shown), and pinning structure 120' that correspond to shields 102 and 108, nonmagnetic insulating layer 104, sensor 110 having pinned layer 112, nonmagnetic spacer layer 114, and free layer 116, bias layers 106, and pinning structure 120, respectively. Thus, the components 102', 108', 110', 112', 114', 116', and 120' have a similar structure and function to the components 102, 108, 110, 112, 114, 116, and 120, respectively. Further, although an ABS view is not shown, the transducer 100' may appear substantially the same from the ABS as the transducer 100.

In the embodiment shown, the pinning structure 120' consists of a hard magnetic layer 122. The hard magnetic layer 122 has a high anisotropy. For example, the hard magnetic layer may have a magnetic anisotropy of at least $6 \times 10^5$ ergs/cc. The hard magnetic layer 122 may include materials such as Co and/or Fe. For example, disordered CoCrPt and CoFe alloys, ordered FePt and CoPt alloys, Heusler compounds, and rare earth-transition metal compounds having a high magnetic anisotropy might be used for the hard magnetic layer 122. Other materials may also be used in addition to or in lieu of the above materials. Further, if hard bias structures such as the hard bias structures 106 of FIG. 2A are used, then the hard magnetic layer 122 is desired to be separately configurable from the hard bias structures. For example, the hard magnetic layer 122 may have a different coercivity than the hard bias structures. Thus, the magnetic moments of the hard bias structures may be set independently from the magnetic moment of the hard magnetic layer 122. The hard magnetic layer 122 may be a single constituent layer, an alloy, a multilayer, or have another structure. The hard magnetic layer 122 is on a portion of the pinned layer 112' recessed from the ABS and is recessed from the back edge of the free layer 116'. In some embodiments, the hard magnetic layer 122 is recessed from the free layer 116' by at least fifty Angstroms. In some embodiments, the pinning structure 122 may be recessed from the free layer 116' by not more than one micron. Further, the hard magnetic layer 122 adjoins the pinned layer 112'.

The pinning structure 120' is used to stabilize the pinned layer 112'. More specifically, the hard magnetic layer 122 of the pinning structure 120' magnetically biases, or pins, the magnetization of the pinned layer 112' in the desired direction. In the embodiment shown, the hard magnetic layer 122 pins the magnetic moment of the pinned layer 112' in the stripe height direction. Because the hard magnetic layer 122 adjoins the pinned layer 112', their magnetic moments are in the same direction. In the embodiment shown, the pinned layer 112' is an extended pinned layer having a stripe height SH2' that is greater than that of the free layer, SH1'. Thus, the pinning structure 120' resides on a portion of the pinned layer 112' recessed from the free layer 116'. Note that if the pinned layer 112' is a SAF, then the ferromagnetic layer adjoining the hard magnetic layer 122 would have its magnetic moment parallel to the magnetic moment of the hard magnetic layer 122 while the other ferromagnetic layer would have its magnetic moment antiparallel to the magnetic moment of the hard magnetic layer 122. This pinning of the magnetic moment of the pinned layer 112' may be assisted by the shape anisotropy of the pinned layer 112'.

The pinning structure 120' shares the benefits of the pinning structure 120. Using the pinning structure 120', the magnetic moment of the pinned layer 112' can be stabilized in the desired direction with a reduced track width of the read sensor 110' and a lower shield-to-shield spacing. A wider range of materials may also be used for the hard magnetic layer 122. For example, because the hard magnetic layer 122 is recessed from the ABS, ferromagnetic materials that would corrode if at the ABS may be used for the pinning structure 120' without corrosion issues. Thus, a read transducer 100' suitable for use at higher magnetic recording densities may be provided.

Figure 4:
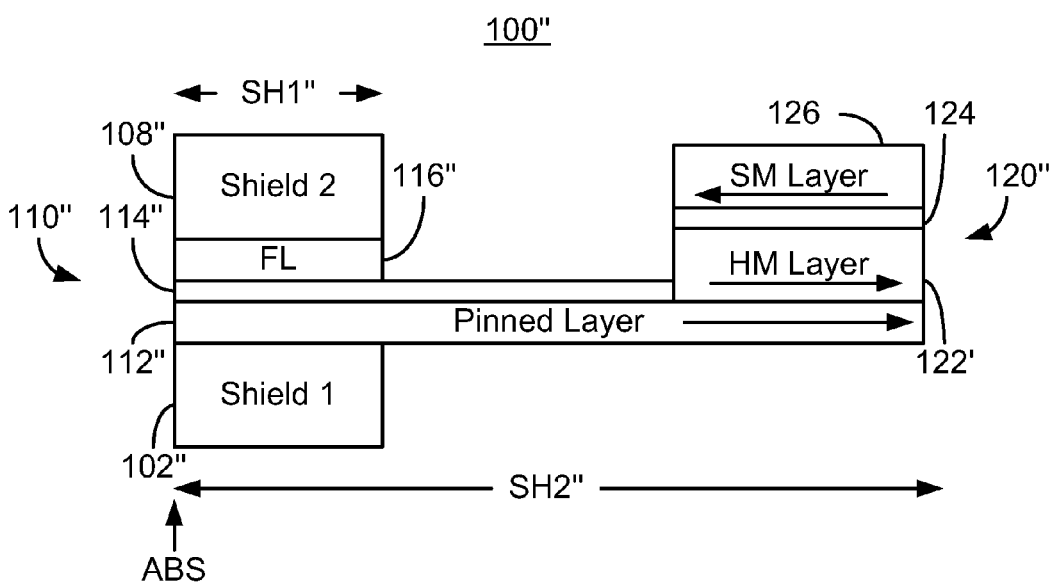
FIG. 4 depicts a side view of another exemplary embodiment of a portion of a magnetic recording read transducer.

FIG. 4 depicts a side view of an exemplary embodiment of a portion of a magnetic read transducer 100". For clarity, FIG. 4 is not to scale. The read transducer 100" may be part of a read head or may be part of a merged head that also includes a write transducer. The head of which the read transducer 100" is a part is part of a disk drive having a media, a slider and the head coupled with the slider. Further, the magnetic read transducer 100" corresponds to the magnetic read transducers 100 and 100'. Similar components have analogous labels. The magnetic transducer 100" includes optional shields 102" and 108", nonmagnetic insulating layer (not shown), sensor 110" having pinned layer 112", nonmagnetic spacer layer 114", and free layer 116", optional bias layers (not shown), and pinning structure 120" that correspond to shields 102/102' and 108/108', nonmagnetic insulating layer 104, sensor 110/110' having pinned layer 112/112', nonmagnetic spacer layer 114/114', and free layer 116/116', bias layers 106, and pinning structure 120/120', respectively. For example, in the embodiment shown, the pinned layer 112" is an extended pinned layer having a stripe height SH2" that is greater than that of the free layer, SH1". Thus, the components 102", 108", 110", 112", 114", 116", and 120" have a similar structure and function to the components 102/102', 108/108', 110/110', 112/112', 114/114', 116/116', and 120/120', respectively. Further, although an ABS view is not shown, the transducer 100" may appear substantially the same from the ABS as the transducers 100 and 100'.

In the embodiment shown, the pinning structure 120" includes not only a hard magnetic layer 122', but also a nonmagnetic layer 124 and a soft magnetic layer 126. The hard magnetic layer 122" corresponds to the hard magnetic layer 122/122'. Thus, the hard magnetic layer 122' may have analogous properties, structure, shape, composition and location as the hard magnetic layer 122. The hard magnetic layer 122' also adjoins the pinned layer 112'. The nonmagnetic layer 124 may include materials such as Ru and separates the hard magnetic layer 122' from the soft magnetic layer 126. The soft magnetic layer 126 may include materials such as Fe, Co, and Ni. The soft magnetic layer 126 also has a low coercivity. For example, the coercivity of the soft magnetic layer 126 may be less than or equal to one hundred Oe. In addition, the soft magnetic layer 126 is magnetically coupled with the hard magnetic layer 122'. In some embodiments, the layers 122', 124 and 126 may be considered to form a SAF.

The hard magnetic layer 122' of the pinning structure 120" is used to stabilize the pinned layer 112" by pinning the magnetic moment of the pinned layer 112" in the desired direction. In the embodiment shown, the hard magnetic layer 122' pins the magnetic moment of the pinned layer 112" in the stripe height direction. Note that if the pinned layer 112' is a SAF, then the ferromagnetic layer adjoining the hard magnetic layer 122 would have its magnetic moment parallel to the magnetic moment of the hard magnetic layer 122 while the other ferromagnetic layer would have its magnetic moment antiparallel to the magnetic moment of the hard magnetic layer 122. This pinning of the pinned layer magnetic moment may be assisted by the shape anisotropy of the pinned layer 112. The soft magnetic layer 126 and nonmagnetic layer 124 may be used to provide flux closure for the pinning structure 120". Thus fringing fields from the pinning structure 120" may be reduced or eliminated.

The pinning structure 120" shares the benefits of the pinning structures 120 and 120'. Using the pinning structure 120", the magnetic moment of the pinned layer 112" can be stabilized in the desired direction with a reduced track width of the read sensor 110' and a lower shield-to-shield spacing. A wider range of materials may also be used for the hard magnetic layer 122' because the hard magnetic layer 122' is recessed from the ABS. In addition, the presence of the nonmagnetic layer 124 and soft magnetic layer 126 allow for reduced fringing fields from the pinning structure 120". Thus, a read transducer 100" suitable for use at higher magnetic recording densities may be provided.

Figure 5:
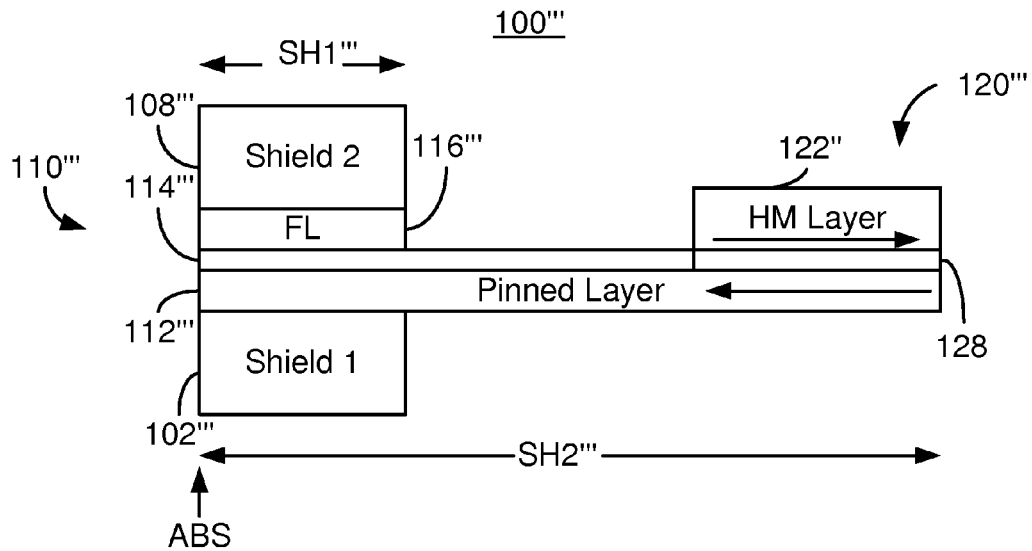
FIG. 5 depicts a side view of another exemplary embodiment of a portion of a magnetic recording read transducer.

FIG. 5 depicts a side view of an exemplary embodiment of a portion of a magnetic read transducer 100'''. For clarity, FIG. 5 is not to scale. The read transducer 100''' may be part of a read head or may be part of a merged head that also includes a write transducer. The head of which the read transducer 100''' is a part is part of a disk drive having a media, a slider and the head coupled with the slider. Further, the magnetic read transducer 100''' corresponds to the magnetic read transducers 100, 100' and, to an extent, 100". Similar components have analogous labels. The magnetic transducer 100''' includes optional shields 102''' and 108''', nonmagnetic insulating layer (not shown), sensor 110''' having pinned layer 112''', nonmagnetic spacer layer 114''', and free layer 116''', optional bias layers (not shown), and pinning structure 120''' that correspond to shields 102/102'/102" and 108/108'/108", nonmagnetic insulating layer 104, sensor 110/110'/110" having pinned layer 112/112'/112", nonmagnetic spacer layer 114/114'/114", and free layer 116/116'/116", bias layers 106, and pinning structure 120/120'/120", respectively. For example, in the embodiment shown, the pinned layer 112''' is an extended pinned layer having a stripe height SH2''' that is greater than that of the free layer, SH1'''. Thus, the components 102''', 108''', 110''', 112''', 114''', 116''', and 120''' have a similar structure and function to the components 102/102'/102", 108/108'/108", 110/110'/110", 112/112'/112", 114/114'/114", 116/116'/116", and 120/120'/120", respectively.

Further, although an ABS view is not shown, the transducer 100''' may appear substantially the same from the ABS as the transducer 100.

In the embodiment shown, the pinning structure 120'''' includes a hard magnetic layer 122''' and a nonmagnetic layer 128'. The hard magnetic layer 122''' corresponds to the hard magnetic layer 122/122'/122''. Thus, the hard magnetic layer 122''' may have analogous properties, structure, shape, composition and location as the hard magnetic layers 122/122'/122''. The nonmagnetic layer 128 is between the hard magnetic layer 122'' and the pinned layer 112'''. The nonmagnetic layer 128 includes materials such as Ru, which allow an indirect exchange interaction between the pinned layer 128 and the hard magnetic layer 122'''.

The pinning structure 120''' is used to stabilize the pinned layer 112'''. More specifically, the hard magnetic layer 122'' of the pinning structure 120''' pins the magnetization of the pinned layer 112''' in the desired direction. In the embodiment shown, the hard magnetic layer 122'' pins the magnetic moment of the pinned layer 112''' in the stripe height direction. This pinning may be assisted by the shape anisotropy of the pinned layer 112'''. Because of the presence of the nonmagnetic layer 128, the magnetic moments of the pinned layer 112''' and the hard magnetic layer 122'' are in opposite directions. Note that if the pinned layer 112''' is a SAF, then the ferromagnetic layer closest to the hard magnetic layer 122'' would have its magnetic moment antiparallel to the magnetic moment of the hard magnetic layer 122'' while the other ferromagnetic layer would have its magnetic moment parallel to the magnetic moment of the hard magnetic layer 122''.

The pinning structure 120''' shares the benefits of the pinning structure 120/120'/120''. Using the pinning structure 120''', the magnetic moment of the pinned layer 112''' can be stabilized in the desired direction with a reduced track width of the read sensor 110' and a lower shield-to-shield spacing. A wider range of materials may also be used for the hard magnetic layer 122''. For example, because the hard magnetic layer 122'' is recessed from the ABS, ferromagnetic materials that would corrode if at the ABS may be used for the pinning structure 120''' without corrosion issues. Thus, a read transducer 100''' suitable for use at higher magnetic recording densities may be provided.

Figure 6:
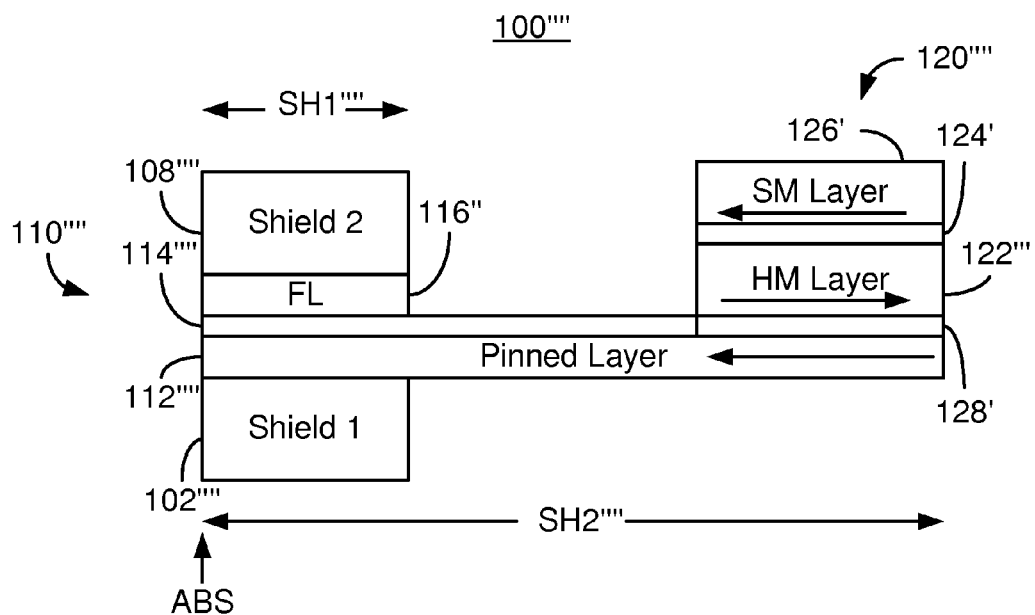
FIG. 6 depicts a side view of another exemplary embodiment of a portion of a magnetic recording read transducer.

FIG. 6 depicts a side view of an exemplary embodiment of a portion of a magnetic read transducer 100''''. For clarity, FIG. 6 is not to scale. The read transducer 100'''' may be part of a read head or may be part of a merged head that also includes a write transducer. The head of which the read transducer 100'''' is a part is part of a disk drive having a media, a slider and the head coupled with the slider. Further, the magnetic read transducer 100'''' corresponds to the magnetic read transducers 100, 100', 100'', and 100'''. Similar components have analogous labels. The magnetic transducer 100'''' includes optional shields 102'''' and 108'''', nonmagnetic insulating layer (not shown), sensor 110'''' having pinned layer 112'''', nonmagnetic spacer layer 114'''', and free layer 116'''', optional bias layers (not shown), and pinning structure 120'''' that correspond to shields 102/102'/102''/102''' and 108/108'/108''/108''', nonmagnetic insulating layer 104, sensor 110/110'/110''/110''' having pinned layer 112/112'/112''/112''', nonmagnetic spacer layer 114/114'/114''/114''', and free layer 116/116'/116''/116''', bias layers 106, and pinning structure 120/120'/120''/120''', respectively. For example, in the embodiment shown, the pinned layer 112'''' is an extended pinned layer having a stripe height SH2'''' that is greater than that of the free layer, SH1''''. Thus, the components 102'''', 108'''', 110'''', 112'''', 114'''', 116'''', and 120'''' have a similar structure and function to the components 102/102'/102''/102''', 108/108'/108''/108''', 110/110'/110''/110''', 112/112'/112''/112''', 114/114'/114''/114''', 116/116'/116''/116''', and 120/120'/120''/120''', respectively. Further, although an ABS view is not shown, the transducer 100'''' may appear substantially the same from the ABS as the transducers 100, 100', 100'', and 100'''.

In the embodiment shown, the pinning structure 120'''' includes not only a hard magnetic layer 122''', and a nonmagnetic layer 128', but also a nonmagnetic layer 124' and a soft magnetic layer 126'. The hard magnetic layer 122''' corresponds to the hard magnetic layer 122. Thus, the hard magnetic layer 122' may have analogous properties, structure, shape, composition and location as the hard magnetic layer 122/122'/122''. The nonmagnetic layer 128' corresponds to the nonmagnetic layer 128. The nonmagnetic layer 128' is thus between the hard magnetic layer 122''' and the pinned layer 112''''. The soft magnetic layer 126' and nonmagnetic layer 124' correspond to the soft magnetic layer 126 and the nonmagnetic layer 124, respectively. Thus, the layers 124', 126', and 128' may have analogous properties, structure, shape, composition and location as the layers 124, 126, and 128, respectively. The soft magnetic layer 126' is thus magnetically coupled with the hard magnetic layer 122'' to form a SAF.

The hard magnetic layer 122''' pins the magnetic moment of the pinned layer 112'''' in the desired direction. In the embodiment shown, the hard magnetic layer 122''' pins the magnetic moment of the pinned layer 112'''' in the stripe height direction. This pinning may be assisted by the shape anisotropy of the pinned layer 112''. Because of the presence of the nonmagnetic layer 128', the magnetic moments of the pinned layer 112'''' and the hard magnetic layer 122''' are in opposite directions. Note that if the pinned layer 112'''' is a SAF, then the ferromagnetic layer closest to the hard magnetic layer 122''' would have its magnetic moment antiparallel to the magnetic moment of the hard magnetic layer 122''' while the other ferromagnetic layer would have its magnetic moment parallel to the magnetic moment of the hard magnetic layer 122'''. The soft magnetic layer 126' and nonmagnetic layer 124' may be used to provide flux closure for the pinning structure 120''''. Thus fringing fields from the pinning structure 120'' may be reduced or eliminated.

The pinning structure 120'''' shares the benefits of the pinning structures 120, 120', 120'' and 120'''. Using the pinning structure 120'''', the magnetic moment of the pinned layer 112'''' can be stabilized in the desired direction with a reduced track width of the read sensor 110' and a lower shield-to-shield spacing. A wider range of materials may also be used for the hard magnetic layer 122''' because the hard magnetic layer 122''' is recessed from the ABS. In addition, the presence of the nonmagnetic layer 124' and soft magnetic layer 126' allow for reduced fringing fields from the pinning structure 120''''. Thus, a read transducer 100''' suitable for use at higher magnetic recording densities may be provided.

Figure 7:
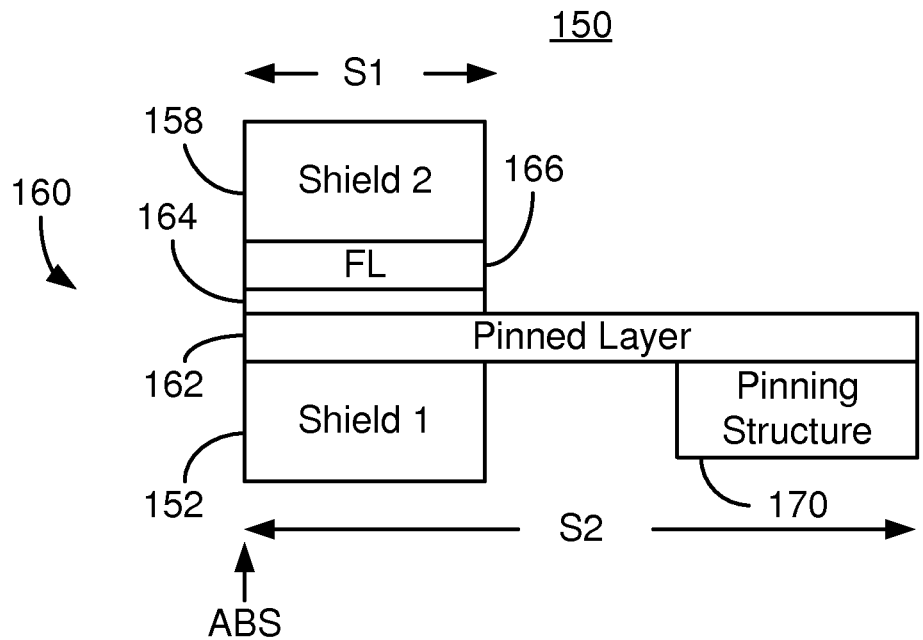
FIG. 7 depicts a side view of another exemplary embodiment of a portion of a magnetic recording read transducer.

FIG. 7 depicts a side view of an exemplary embodiment of a portion of a magnetic read transducer 150. For clarity, FIG. 7 is not to scale. The read transducer 150 may be part of a read head or may be part of a merged head that also includes a write transducer. The head of which the read transducer 150 is a part is part of a disk drive having a media, a slider and the head coupled with the slider. Further, the magnetic read transducer 150 corresponds to the magnetic read transducers 100, 100', 100'', 100''', and 100''''. Similar components have analogous labels. The magnetic transducer 150 includes optional shields 152 and 158, nonmagnetic insulating layer (not shown), sensor 160 having pinned layer 162, nonmagnetic spacer layer 164, and free layer 166, optional bias layers (not shown), and pinning structure 170 that correspond to shields 102/102'/102"/102'''/102'''' and 108/108'/108"/108'''/108'''', nonmagnetic insulating layer 104, sensor 110/110'/110"/110'''/110'''' having pinned layer 112/112'/112"/112'''/112'''', nonmagnetic spacer layer 114/114'/114"/114'''/114'''', and free layer 116/116'/116"/116'''/116'''', bias layers 106, and pinning structure 120/120'/120"/120'''/120'''', respectively. Stated differently, components shown in FIG. 7 have an analogous structure, function, composition, location, and geometry as those depicted in FIGS. 2, 3, 4, 5, and 6. Further, although an ABS view is not shown, the transducer 150 may appear substantially the same from the ABS as the transducers 100, 100', 100", and 100''', 100''''.

The pinning structure 170 is shown as residing below the pinned layer 162. Thus, in the embodiment shown, the pinned layer 162 may be fabricated on the pinning structure 170. The pinned layer 162 is thus an extended pinned layer, having a length, S2, in the stripe height direction that is greater than the stripe height of the free layer 166, S1. The geometry and function of the pinning structure 170 may be analogous to that of the pinning structures 120, 120', 120", 120''', and 120''''. Thus, the pinning structure 170 includes at least a hard magnetic layer. In some embodiments, the pinning structure 170 may include a nonmagnetic layer between the hard magnetic layer and the pinned layer 162. In some embodiments, the pinning structure 170 may include a soft magnetic layer and a nonmagnetic layer between the hard magnetic layer and the soft magnetic layer. In other embodiments, the pinning structure may include some combination of the above embodiments. The hard magnetic layer (not explicitly shown in FIG. 7) pins the magnetic moment of the pinned layer 162 in the desired direction.

The pinning structure 170 shares the benefits of the pinning structures 120, 120', 120" 120''', and 120''''. Using the pinning structure 170, the magnetic moment of the pinned layer 162 can be stabilized in the desired direction with a reduced track width of the read sensor 160 and a lower shield-to-shield spacing. A wider range of materials may also be used for the hard magnetic layer of the pinning structure 170 because the hard magnetic layer is recessed from the ABS. In addition, if layers such as the nonmagnetic layer 124/124' and soft magnetic layer 126/126' are used, reduced fringing fields from the pinning structure 170 may be achieved. Thus, a read transducer 150 suitable for use at higher magnetic recording densities may be provided.

Figure 8:
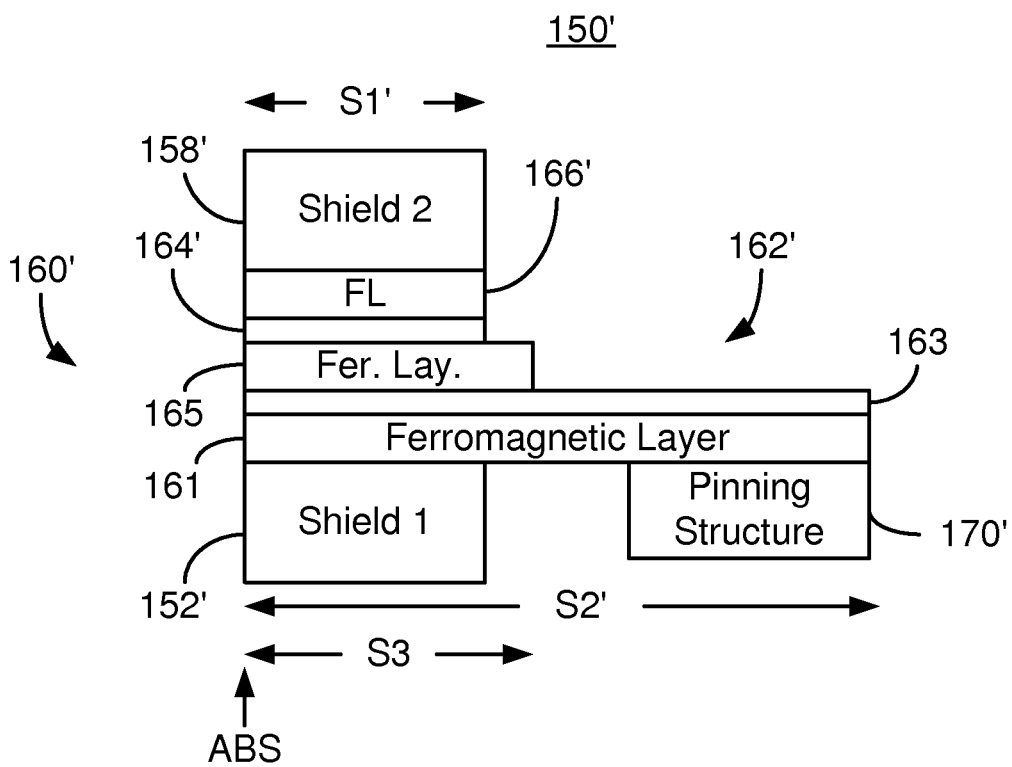
FIG. 8 depicts a side view of another exemplary embodiment of a portion of a magnetic recording read transducer.

FIG. 8 depicts a side view of an exemplary embodiment of a portion of a magnetic read transducer 150'. For clarity, FIG. 8 is not to scale. The read transducer 150' may be part of a read head or may be part of a merged head that also includes a write transducer. The head of which the read transducer 150' is a part is part of a disk drive having a media, a slider and the head coupled with the slider. Further, the magnetic read transducer 150 corresponds to the magnetic read transducers 100, 100', 100", 100''', 100'''', and 150. Similar components have analogous labels. The magnetic transducer 150' includes optional shields 152' and 158', nonmagnetic insulating layer (not shown), sensor 160' having pinned layer 162', nonmagnetic spacer layer 164', and free layer 166', optional bias layers (not shown), and pinning structure 170' that correspond to shields 152 and 158, nonmagnetic insulating layer 104, sensor 160 having pinned layer 162, nonmagnetic spacer layer 164, and free layer 166, bias layers 106, and pinning structure 170, respectively. Stated differently, components shown in FIG. 8 have an analogous structure, function, composition, location, and geometry as those depicted in FIGS. 2, 3, 4, 5, 6, and 7. Further, although an ABS view is not shown, the transducer 150' may appear substantially the same from the ABS as the transducers 100, 100', 100", 100''', 100'''' and 150.

The pinning structure 170' is shown as residing below the pinned layer 162'. Thus, in the embodiment shown, the pinned layer 162' may be fabricated on the pinning structure 170'. The pinned layer 162' is thus an extended pinned layer, having a length, S2', in the stripe height direction that is greater than the stripe height of the free layer 166', S1'. The geometry and function of the pinning structure 170' may be analogous to that of the pinning structures 120, 120', 120", 120''', 120'''', and 170. Thus, the pinning structure 170' includes at least a hard magnetic layer. In some embodiments, the pinning structure 170' may include a nonmagnetic layer between the hard magnetic layer and the pinned layer 162'. In some embodiments, the pinning structure 170' may include a soft magnetic layer and a nonmagnetic layer between the hard magnetic layer and the soft magnetic layer. In other embodiments, the pinning structure 170' may include some combination of the above embodiments. The hard magnetic layer (not explicitly shown in FIG. 8) pins the magnetic moment of the pinned layer 162' in the desired direction.

In addition, the pinned layer 162' is explicitly shown as a SAF structure. Thus, the pinned layer 162' includes ferromagnetic layers 161 and 165 separated by a nonmagnetic layer 163. The ferromagnetic layer 161 has its magnetic moment pinned by the hard magnetic layer in the pinning structure 170'. In the embodiment shown, the ferromagnetic layer 165 has a reduced stripe height, S3. Thus, in some embodiments, the ferromagnetic layer 165 closer to the free layer 166' may have a length in the stripe height direction of at least S1' and not more than S2'.

The pinning structure 170' shares the benefits of the pinning structures 120, 120', 120" 120''', 120'''', and 170. Using the pinning structure 170', the magnetic moment of the pinned layer 162' can be stabilized in the desired direction with a reduced track width of the read sensor 160' and a lower shield-to-shield spacing. A wider range of materials may also be used for the hard magnetic layer of the pinning structure 170' because the hard magnetic layer is recessed from the ABS. In addition, if layers such as the nonmagnetic layer 124/124' and soft magnetic layer 126/126' are used, reduced fringing fields from the pinning structure 170' may be achieved. Thus, a read transducer 150' suitable for use at higher magnetic recording densities may be provided.

Figure 9:
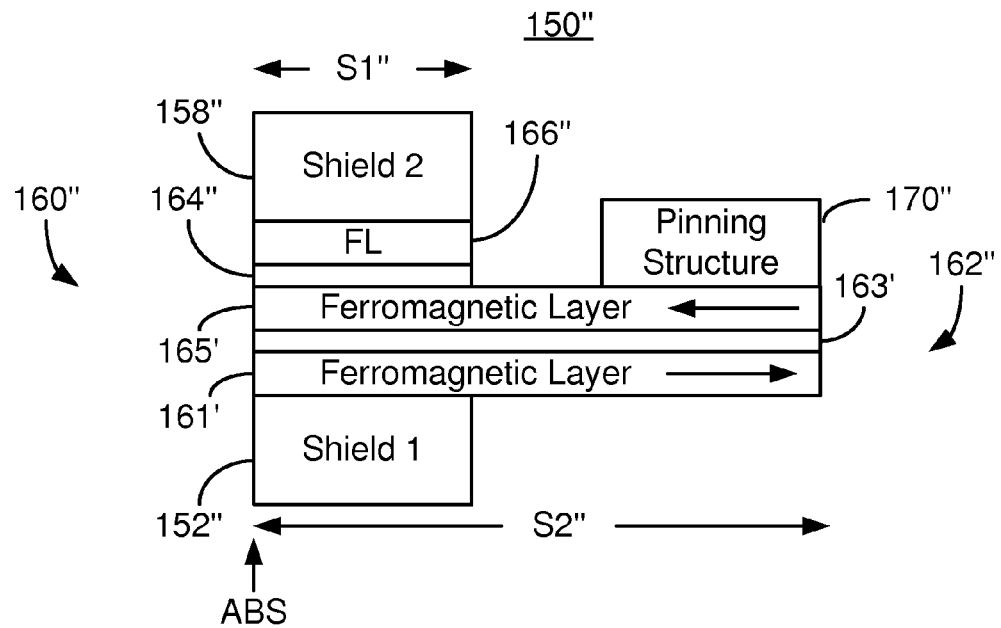
FIG. 9 depicts a side view of another exemplary embodiment of a portion of a magnetic recording read transducer.

FIG. 9 depicts a side view of an exemplary embodiment of a portion of a magnetic read transducer 150". For clarity, FIG. 9 is not to scale. The read transducer 150" may be part of a read head or may be part of a merged head that also includes a write transducer. The head of which the read transducer 150' is a part is part of a disk drive having a media, a slider and the head coupled with the slider. Further, the magnetic read transducer 150' corresponds to the magnetic read transducers 100, 100', 100", 100''', 100'''', 150 and 150'. Similar components have analogous labels. The magnetic transducer 150" includes optional shields 152" and 158", nonmagnetic insulating layer (not shown), sensor 160" having pinned layer 162", nonmagnetic spacer layer 164", and free layer 166", optional bias layers (not shown), and pinning structure 170" that correspond to shields 152/152' and 158/158', nonmagnetic insulating layer 104, sensor 160/160' having pinned layer 162/162', nonmagnetic spacer layer 164/164', and free layer 166/166', bias layers 106/106', and pinning structure 170/170', respectively. Stated differently, components shown in FIG. 9 have an analogous structure, function, composition, location, and geometry as those depicted in FIGS. 2, 3, 4, 5, 6, 7, and 8. Further, although an ABS view is not shown, the transducer 150" may appear substantially the same from the ABS as the transducers 100, 100', 100", 100'", 100"", 150 and 150'.

The pinning structure 170" is shown as residing above pinned layer 162", as is shown in FIGS. 2A-6. Thus, in the embodiment shown, the pinning structure 170" may be fabricated on the pinned layer 162". The pinned layer 162" is thus an extended pinned layer, having a length, S2", in the stripe height direction that is greater than the stripe height of the free layer 166", S1". The geometry and function of the pinning structure 170" may be analogous to that of the pinning structures 120, 120', 120", 120'", 120"", 170 and 170'. Thus, the pinning structure 170" includes at least a hard magnetic layer. In some embodiments, the pinning structure 170" may include a nonmagnetic layer between the hard magnetic layer and the pinned layer 162". In some embodiments, the pinning structure 170" may include a soft magnetic layer and a nonmagnetic layer between the hard magnetic layer and the soft magnetic layer. In other embodiments, the pinning structure 170" may include some combination of the above embodiments. The hard magnetic layer (not explicitly shown in FIG. 9) pins the magnetic moment of the pinned layer 162" in the desired direction.

In addition, the pinned layer 162" is explicitly shown as a SAF structure. Thus, the pinned layer 162" includes ferromagnetic layers 161' and 165' separated by a nonmagnetic layer 163'. The ferromagnetic layer 165' (closest to the free layer 165') has its magnetic moment pinned by the hard magnetic layer in the pinning structure 170". Thus, the ferromagnetic layer 165' has a stripe height that is greater than S1" and is sufficient to provide for at least a fifty Angstrom distance between the free layer 166' and the pinning structure 170". In the embodiment shown, the ferromagnetic layer 165' has a stripe height, S2" that is the same as the ferromagnetic layer 161'. However, in some embodiments, the ferromagnetic layer 165' may have a length in the stripe height direction that is less than S2'.

The pinning structure 170" shares the benefits of the pinning structures 120, 120', 120" 120'", 120"", 170 and 170'. Using the pinning structure 170", the magnetic moment of the pinned layer 162" can be stabilized in the desired direction with a reduced track width of the read sensor 160" and a lower shield-to-shield spacing. A wider range of materials may also be used for the hard magnetic layer of the pinning structure 170" because the hard magnetic layer is recessed from the ABS. In addition, if layers such as the nonmagnetic layer 124/124' and soft magnetic layer 126/126' are used, reduced fringing fields from the pinning structure 170" may be achieved. Thus, a read transducer 150" suitable for use at higher magnetic recording densities may be provided.

Figure 10:
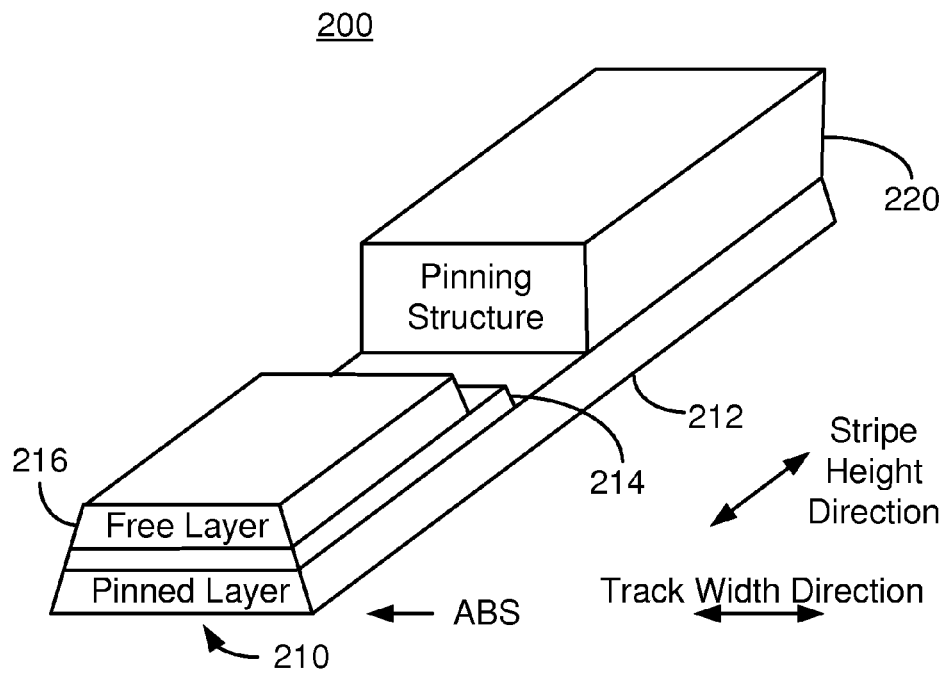
FIG. 10 is a perspective view of an exemplary embodiment of a portion of a magnetic recording read transducer.

FIG. 10 depicts a perspective view of an exemplary embodiment of a portion of a magnetic read transducer 200. For clarity, FIG. 10 is not to scale. The read transducer 200 may be part of a read head or may be part of a merged head that also includes a write transducer. The head of which the read transducer 200 is a part is part of a disk drive having a media, a slider and the head coupled with the slider. Further, the magnetic read transducer 200 corresponds to the magnetic read transducers 100, 100', 100", 100'", 100"", 150, 150', and/or 150". Similar components have analogous labels. The magnetic transducer 200 includes optional shields (not shown), nonmagnetic insulating layer (not shown), sensor 210 having pinned layer 212, nonmagnetic spacer layer 214, and free layer 216, and optional bias layers (not shown) that correspond to shields, nonmagnetic insulating layer, sensor having pinned layer, nonmagnetic spacer layer, and free layer, and bias layers, respectively shown in FIGS. 2A-9. Further, the transducer 200 includes pinning structure 220 that may be analogous to one or more of the pinning structures 120, 120', 120", 120'", 120"", 170, 170', and/or 170". Stated differently, components shown in FIG. 10 have an analogous structure, function, composition, location, and geometry as one or more of those depicted in FIGS. 2A, 2B, 3, 4, 5, 6, 7, 8 and/or 9. Further, although an ABS view is not shown, the transducer 200 may appear substantially the same from the ABS as the remaining transducers. In the embodiment shown, the pinning structure 220 has substantially the same width in the track width direction as the free layer 216.

The pinning structure 220 shares the benefits of the pinning structures 120, 120', 120" 120'", 120"", 170, 170', and/or 170". Using the pinning structure 220, the magnetic moment of the pinned layer 212 can be stabilized in the desired direction with a reduced track width of the read sensor 210 and a lower shield-to-shield spacing. A wider range of materials may also be used for the hard magnetic layer of the pinning structure 220 because the hard magnetic layer is recessed from the ABS. In addition, if layers such as the nonmagnetic layer 124/124' and soft magnetic layer 126/126' are used, reduced fringing fields from the pinning structure 220 may be achieved. Thus, a read transducer 200 suitable for use at higher magnetic recording densities may be provided.

Figure 11:
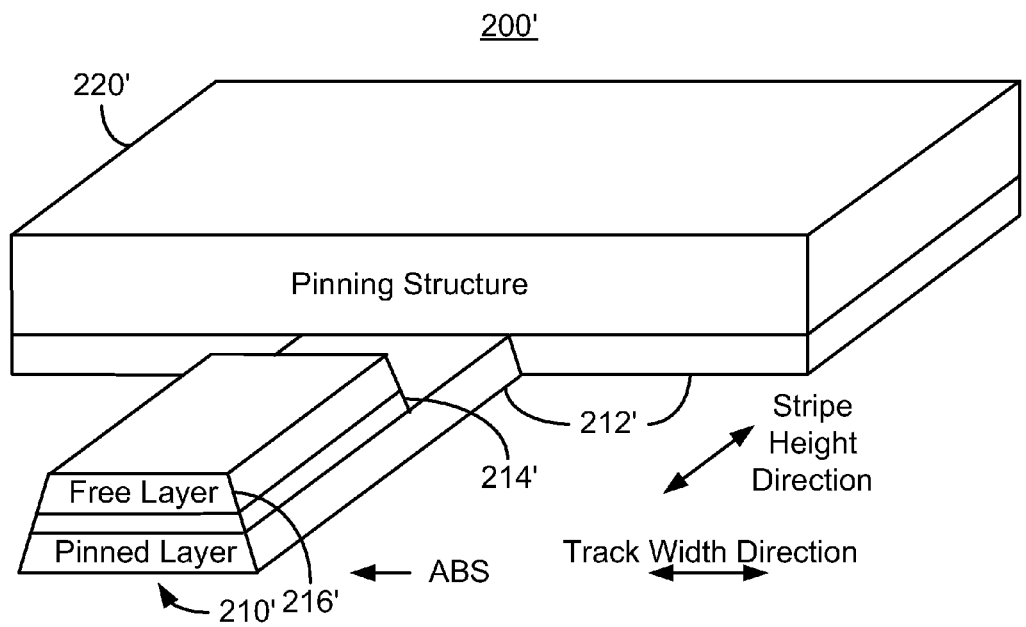
FIG. 11 is a perspective view of an exemplary embodiment of a portion of a magnetic recording read transducer.

FIG. 11 depicts a perspective view of an exemplary embodiment of a portion of a magnetic read transducer 200'. For clarity, FIG. 11 is not to scale. The read transducer 200' may be part of a read head or may be part of a merged head that also includes a write transducer. The head of which the read transducer 200' is a part is part of a disk drive having a media, a slider and the head coupled with the slider. Further, the magnetic read transducer 200' corresponds to the magnetic read transducers 100, 100', 100", 100'", 100"", 150, 150', 150" and/or 200. Similar components have analogous labels. The magnetic transducer 200' includes optional shields (not shown), nonmagnetic insulating layer (not shown), sensor 210' having pinned layer 212', nonmagnetic spacer layer 214', and free layer 216', and optional bias layers (not shown) that correspond to shields, nonmagnetic insulating layer, sensor having pinned layer, nonmagnetic spacer layer, and free layer, and bias layers, respectively shown in FIGS. 2A-10. Further, the transducer 200' includes pinning structure 220' that may be analogous to one or more of the pinning structures 120', 120', 120", 120'", 120"", 170, 170', 170" and/or 220. Stated differently, components shown in FIG. 11 have an analogous structure, function, composition, location, and geometry as one or more of those depicted in FIGS. 2A, 2B, 3, 4, 5, 6, 7, 8. 9 and/or 10. Further, although an ABS view is not shown, the transducer 200' may appear substantially the same from the ABS as the remaining transducers. In the embodiment shown, the pinning structure 220' and the portion of the pinned layer 212' adjoining the pinning structure 220' are wider in the track width direction than the free layer 216'.

The pinning structure 220' shares the benefits of the pinning structures 120, 120', 120" 120'", 120"", 170, 170', 170" and/or 220. Using the pinning structure 220, the magnetic moment of the pinned layer 212' can be stabilized in the desired direction with a reduced track width of the read sensor 210' and a lower shield-to-shield spacing. A wider range of materials may also be used for the hard magnetic layer of the pinning structure 220' because the hard magnetic layer is recessed from the ABS. In addition, if layers such as the nonmagnetic layer 124/124' and soft magnetic layer 126/126' are used, reduced fringing fields from the pinning structure 220' may be achieved. Thus, a read transducer 200' suitable for use at higher magnetic recording densities may be provided.

Figure 12:
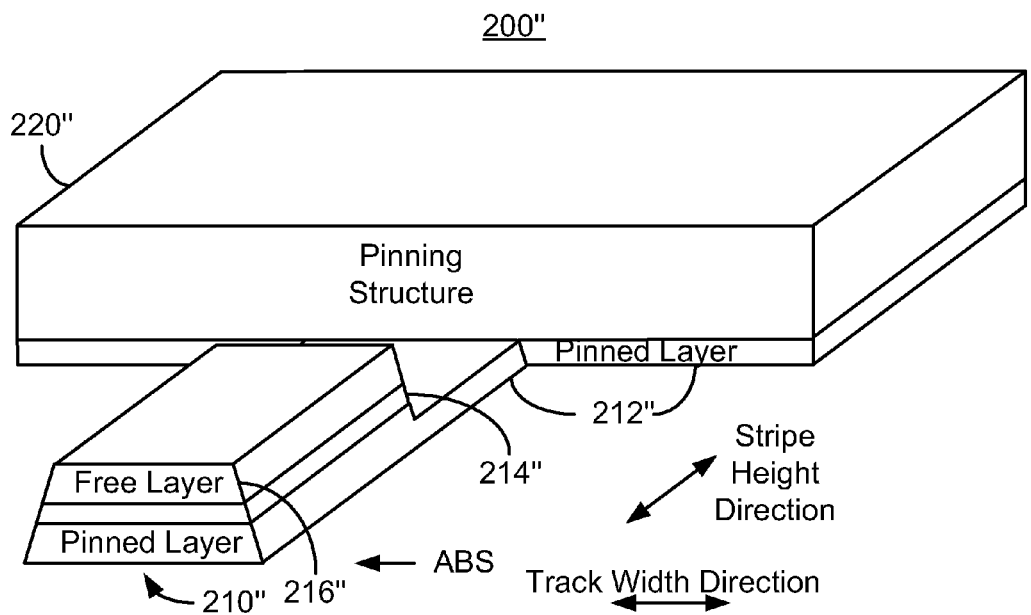
FIG. 12 is a perspective view of an exemplary embodiment of a portion of a magnetic recording read transducer.

FIG. 12 depicts a perspective view of an exemplary embodiment of a portion of a magnetic read transducer 200". For clarity, FIG. 12 is not to scale. The read transducer 200" may be part of a read head or may be part of a merged head that also includes a write transducer. The head of which the read transducer 200" is a part is part of a disk drive having a media, a slider and the head coupled with the slider. Further, the magnetic read transducer 200" corresponds to the magnetic read transducers 100, 100', 100", 100'", 100"", 150, 150', 150'150", 200 and/or 200'. Similar components have analogous labels. The magnetic transducer 200" includes optional shields (not shown), nonmagnetic insulating layer (not shown), sensor 210" having pinned layer 212", nonmagnetic spacer layer 214", and free layer 216", and optional bias layers (not shown) that correspond to shields, nonmagnetic insulating layer, sensor having pinned layer, nonmagnetic spacer layer, and free layer, and bias layers, respectively shown in FIGS. 2A-11. Further, the transducer 200" includes pinning structure 220" that may be analogous to one or more of the pinning structures 120', 120', 120", 120'", 120"", 170, 170', 170", 220 and/or 220'. Stated differently, components shown in FIG. 12 have an analogous structure, function, composition, location, and geometry as one or more of those depicted in FIGS. 2A, 2B, 3, 4, 5, 6, 7, 8. 9, 10 and/or 11. Further, although an ABS view is not shown, the transducer 200" may appear substantially the same from the ABS as the remaining transducers. In the embodiment shown, the pinning structure 220" is wider in the track width direction than the free layer 216". In addition, a portion of the pinned layer 212'" has been removed during fabrication. However, a sufficient amount of the pinned layer 212" remains such that the pinned layer 212" is still be magnetically biased by the pinning structure 220".

The pinning structure 220" shares the benefits of the pinning structures 120, 120', 120" 120'", 120"", 170, 170', 170", 220 and/or 220'. Using the pinning structure 220", the magnetic moment of the pinned layer 212" can be stabilized in the desired direction with a reduced track width of the read sensor 210" and a lower shield-to-shield spacing. A wider range of materials may also be used for the hard magnetic layer of the pinning structure 220" because the hard magnetic layer is recessed from the ABS. In addition, if layers such as the nonmagnetic layer 124/124' and soft magnetic layer 126/126' are used, reduced fringing fields from the pinning structure 220' may be achieved. Thus, a read transducer 200" suitable for use at higher magnetic recording densities may be provided.

It is noted that a single pinning structure 120, 120', 120" 120'", 120"", 170, 170', 170", 220, 220' and/or 220" is shown in FIGS. 2A, 2B, 3, 4, 5, 6, 7, 8, 9, 10, 11, and 12. However, multiple pinning structures may be used. For example, pinning structures could reside both above and below a pinned layer and/or at multiple locations on the same side of the pinned layer. In addition, one or more of the features of the pinning structures 120, 120', 120" 120'", 120"", 170, 170', 170", 220, 220' and/or 220" may be combined in a particular embodiment.

Figure 13:
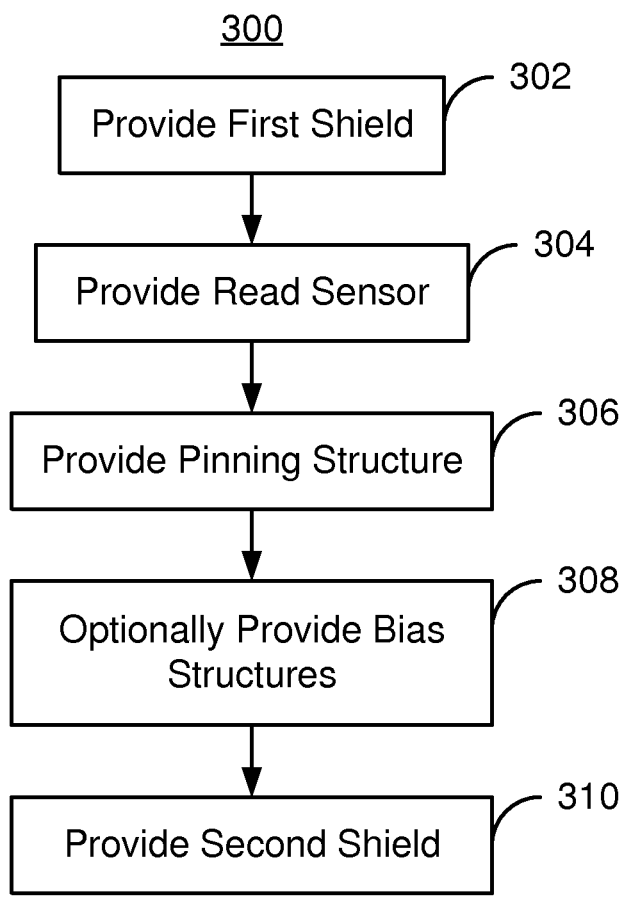
FIG. 13 is flow chart depicting an exemplary embodiment of a method for providing a magnetic recording read transducer.

FIG. 13 is an exemplary embodiment of a method 300 for providing a read transducer utilizing a pinning structure. For simplicity, some steps may be omitted, interleaved, performed in another order and/or combined. The method 300 is also described in the context of providing a single recording transducer 100. However, the method 300 may be used to fabricate multiple transducers at substantially the same time. The method 300 may also be used to fabricate other transducers including but not limited to any combination of 100, 100', 100", 100'", 100"", 150, 150', 150", 200, 200', and/or 200". The method 300 is also described in the context of particular layers. A particular layer may include multiple materials and/or multiple sub-layers. The method 300 also may start after formation of other portions of the magnetic recording transducer.

The shield 102 is optionally provided, via step 302. Step 302 typically includes depositing a large high permeability layer. The shield 102 typically extends significantly further in the track width direction than the read sensor 110 or any bias structures 106.

The read sensor 110 is provided, via step 304. Step 304 typically includes depositing the layers for the sensor 110. Step 304 may include blanket depositing the layers for the read sensor, as well as the defining the read sensor from the layers in at least the track width direction in step 304. In some embodiments, the read sensor 110 is defined using an ion mill. In some embodiments, the sensor 110 is also defined in the stripe height direction. In some embodiments, at least some of the layers for the sensor are not completely milled through to provide extended layers. For example, at least part of the pinned layer 112 may not be milled through in the stripe height direction or may be milled at a different distance from the ABS. Thus, an extended pinned layer may be provided. Similarly, the pinned layer 112 may be configured to be larger in the track width direction distal from the ABS, for example in a manner analogous to the pinned layers 212' and/or 212".

The pinning structure 120 that is recessed from the ABS may be provided, via step 306. In some embodiments, step 304 is performed after step 306. In such embodiments, the films for the read sensor deposited after the pinning structure 120 is provided. In such embodiments, the pinned layer 112 may be deposited on and reside on the pinning structure 120. In other embodiments, step 304 is performed before step 306. In such embodiments, the pinning structure 120 is on the pinned layer 112.

The bias structures 106 may optionally be provided in step 308. Step 308 may include depositing hard bias or other analogous structures. The top shield 108 may optionally then be provided, via step 310. Formation of the transducer 100 may then be completed.

Using the method 300, the transducers 100, 100', 100", 100'", 100"", 150, 150', 150", 200, 200', and/or 200" may be fabricated. Thus, the benefits of one or more of the transducers 100, 100', 100", 100'", 100"", 150, 150', 150", 200, 200', and/or 200" may be achieved.

Figure 14:
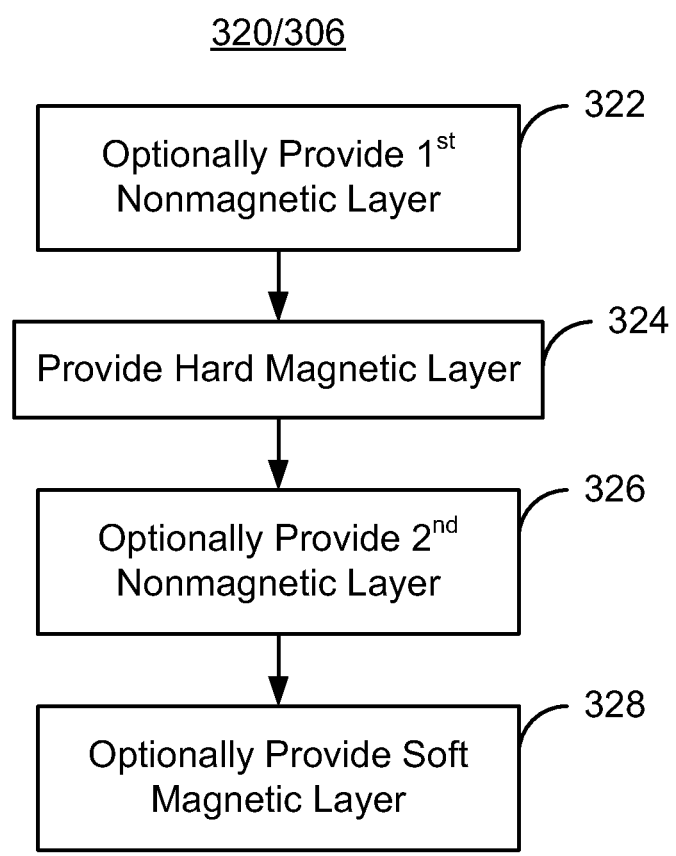
FIG. 14 is flow chart depicting an exemplary embodiment of a method for fabricating a pinning structure for a magnetic recording read transducer.

FIG. 14 depicts an exemplary embodiment of a method 320 for providing the pinning structure. For simplicity, some steps may be omitted, interleaved, performed in another order and/or combined. The method 320 may be viewed as an embodiment of implementing the step 306. The method 320 is also described in the context of providing a single recording transducer 100', 100", 100'" or 100"". However, the method 320 may be used to fabricate multiple transducers at substantially the same time. The method 320 may also be used to fabricate other transducers including but not limited to any combination of 100, 100', 100", 100'", 100"", 150, 150', 150", 200, 200', and/or 200". The method 320 is also described in the context of particular layers. A particular layer may include multiple materials and/or multiple sub-layers. The method 320 also may start after formation of other portions of the magnetic recording transducer.

A nonmagnetic layer is optionally provided adjoining the pinned layer, via step 322. In some embodiments, step 322 includes depositing a Ru layer. However, in other embodiments, other material(s) may be used. Thus, the layer 128/128' may be formed.

The hard magnetic layer 122/122'/122"/122'''/122'''' layer is provided, via step 324. In some embodiments, step 324 depositing the hard magnetic layer adjoining the pinned layer 112. However, in other embodiments, for example in which the step 322 has been performed, the hard magnetic layer does not adjoin the pinned layer 112.

The nonmagnetic layer 124/124' is optionally provided, via step 326. In some embodiments, step 326 includes sputtering or otherwise depositing the materials. The soft magnetic layer 126/126' may also optionally be provided, via step 328. Thus, the pinning structure 120, 120', 120", 120''', 120'''', 170, 170', 170", 220, 220' and/or 220".

Using the method 320, the pinning structures of the transducers 100, 100', 100", 100''', 100'''', 150, 150', 150", 200, 200', and/or 200" may be fabricated. In particular, the pinning structure 120, 120', 120", 120''', 120'''', 170, 170', and/or 170" may be provided. Thus, the benefits of one or more of the transducers 100, 100', 100", 100''', 100'''', 150, 150', 150", 200, 200', and/or 200" may be achieved.

We claim:

1. A magnetic transducer having an air-bearing surface (ABS) comprising:
    a first shield;
    a read sensor including a pinned layer, a spacer layer, and a free layer having a track width, the spacer layer being nonmagnetic and residing between the pinned layer and the free layer, a portion of the read sensor residing at the ABS, the pinned layer being a synthetic antiferromagnet including a first ferromagnetic layer, a second ferromagnetic layer, and a nonmagnetic spacer layer between the first ferromagnetic layer and second ferromagnetic layer;
    a pinning structure recessed from the ABS, the pinning structure including a hard magnetic layer, a soft magnetic layer and a nonmagnetic layer between the hard magnetic layer and the soft magnetic layer, the pinning structure being recessed from the free layer, the hard magnetic layer being adjacent to a portion of the pinned layer, the pinning structure having a width greater than the track width; and
    a second shield, the read sensor residing between the first shield and the second shield.

2. A magnetic transducer having an air-bearing surface (ABS) comprising:
    a read sensor stack including a pinned layer, a spacer layer, and a free layer, the spacer layer being nonmagnetic and residing between the pinned layer and the free layer, a portion of the read sensor stack residing at the ABS, the free layer having a track width at the ABS; and
    a pinning structure including a hard magnetic layer recessed from the ABS, recessed from the free layer and adjoining a portion of the pinned layer, the pinning structure having a width greater than the track width, the pinning structure further including a magnetically soft layer having a coercivity of not more than one hundred Oe and a nonmagnetic layer, the nonmagnetic layer residing between the magnetically soft layer and the hard magnetic layer.

3. The magnetic transducer of claim 2 wherein the free layer extends a first distance from the ABS and the pinned layer extends a second distance from the ABS, the first distance being less than the second distance.

4. The magnetic transducer of claim 3 wherein the hard magnetic layer is recessed from the free layer by at least fifty Angstroms.

5. The magnetic transducer of claim 4 wherein the hard magnetic layer is recessed from the free layer by not more than one micron.

6. The magnetic transducer of claim 2 wherein the hard magnetic layer has a magnetic anisotropy of at least $6 \times 10^5$ ergs/cc.

7. The magnetic transducer of claim 2 wherein the pinned layer has a first side and a second side, the first side being closer to the free layer than the second side and wherein the hard magnetic layer is closer to the first side than the second side.

8. The magnetic transducer of claim 2 wherein the pinned layer has a first side and a second side, the first side being closer to the free layer than the second side and wherein the hard magnetic layer is closer to the second side than the first side.

9. The magnetic transducer of claim 2 wherein the pinned layer is a synthetic antiferromagnet including a first ferromagnetic layer, a second ferromagnetic layer, and a nonmagnetic spacer layer between the first ferromagnetic layer and second ferromagnetic layer.

10. The magnetic transducer of claim 2 further comprising:
    at least one biasing structure adjacent to the free layer, a portion of the at least one biasing structure residing at the ABS.

11. A magnetic transducer having an air-bearing surface (ABS) comprising:
    a read sensor stack including a pinned layer, a spacer layer, and a free layer, the spacer layer being nonmagnetic and residing between the pinned layer and the free layer, a portion of the read sensor stack residing at the ABS, the free layer having a track width at the ABS; and
    a pinning structure including a hard magnetic layer recessed from the ABS, recessed from the free layer and adjacent to a portion of the pinned layer, the pinning structure having a width greater than the track width, the pinning structure including a nonmagnetic layer between the hard magnetic layer and the pinned layer, a magnetically soft layer having a coercivity of not more than one hundred Oe, and an additional nonmagnetic layer, the additional nonmagnetic layer residing between the magnetically soft layer and the hard magnetic layer.

12. A disk drive comprising:
    at least one disk;
    at least one slider including at least one magnetic transducer having an air-bearing surface (ABS), each magnetic transducer including a read sensor stack and a pinning structure recessed from the ABS, the read sensor stack including a pinned layer, a spacer layer, and a free layer, the spacer layer being nonmagnetic and residing between the pinned layer and the free layer, a portion of the read sensor stack residing at the ABS, the free layer having a track width at the ABS, the pinning structure including a hard magnetic layer, a soft magnetic layer and a nonmagnetic layer between the hard magnetic layer and the soft magnetic layer, the hard magnetic layer being recessed from the ABS, recessed from the free layer and adjacent to a portion of the pinned layer, the pinning structure having a width greater than the track width.

13. A method for providing a magnetic read transducer having an air-bearing surface (ABS) comprising:
    providing a read sensor stack including a pinned layer, a spacer layer, and a free layer, the spacer layer being nonmagnetic and residing between the pinned layer and the free layer, a portion of the read sensor stack residing at the ABS, the free layer having a track width at the ABS; and providing a pinning structure including a hard magnetic layer recessed from the ABS, recessed from the free layer and adjoining a portion of the pinned layer, the pinning structure having a width greater than the track width, the step of providing the pinning structure further including providing a magnetically soft layer having a coercivity of not more than one hundred Oe; and providing a nonmagnetic layer, the nonmagnetic layer residing between the magnetically soft layer and the hard magnetic layer.

14. The method of claim 13 wherein the free layer extends a first distance from the ABS and the pinned layer extends a second distance from the ABS, the first distance being less than the second distance.

15. The method of claim 14 wherein the hard magnetic layer is recessed from the free layer by at least fifty Angstroms.

16. The method of claim 15 wherein the hard magnetic layer is recessed from the free layer by not more than one micron.

17. The method of claim 13 wherein the pinned layer is a synthetic antiferromagnet including a first ferromagnetic layer, a second ferromagnetic layer, and a nonmagnetic spacer layer between the first ferromagnetic layer and second ferromagnetic layer.

18. A method for providing a magnetic read transducer having an air-bearing surface (ABS) comprising:

providing a read sensor stack including a pinned layer, a spacer layer, and a free layer, the spacer layer being nonmagnetic and residing between the pinned layer and the free layer, a portion of the read sensor stack residing at the ABS, the free layer having a track width at the ABS; and providing a pinning structure including a hard magnetic layer recessed from the ABS, recessed from the free layer and adjacent to a portion of the pinned layer, the pinning structure having a width greater than the track width, the step of providing the pinning structure further including providing a nonmagnetic layer between the hard magnetic layer and the pinned layer;

providing a magnetically soft layer having a coercivity of not more than one hundred Oe; and providing an additional nonmagnetic layer, the additional nonmagnetic layer residing between the magnetically soft layer and the hard magnetic layer.

* * * * *